(12) United States Patent
Ray et al.

(10) Patent No.: US 10,839,037 B2
(45) Date of Patent: Nov. 17, 2020

(54) CONNECTED APPLICATION EXPERIENCE

(71) Applicant: MICROSOFT TECHNOLOGY LICENSING, LLC, Redmond, WA (US)

(72) Inventors: Aninda Ray, Sammamish, WA (US); Ryan Antoine Nakhoul, Issaquah, WA (US); Benjamin James Kaiser, Redmond, WA (US); Manish Garg, Sammamish, WA (US); Ping Jiang, Redmond, WA (US); Dennis Joel David Myren, Seattle, WA (US); Dmitriy Meyerzon, Bellevue, WA (US); Marc Pasarin Soler, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 16/138,116

(22) Filed: Sep. 21, 2018

(65) Prior Publication Data

US 2020/0097611 A1    Mar. 26, 2020

(51) Int. Cl.
*G06F 15/16* (2006.01)
*G06F 16/955* (2019.01)
(Continued)

(52) U.S. Cl.
CPC ...... *G06F 16/9566* (2019.01); *G06F 9/44521* (2013.01); *G06F 9/5005* (2013.01);
(Continued)

(58) Field of Classification Search
CPC combination set(s) only.
See application file for complete search history.

(56) References Cited

U.S. PATENT DOCUMENTS

| 6,141,686 A | 10/2000 | Jackowski et al. |
| 7,437,707 B2 | 10/2008 | Huerta et al. |

(Continued)

FOREIGN PATENT DOCUMENTS

| CA | 2994274 A1 | 2/2017 |
| CN | 107250981 A | 10/2017 |

(Continued)

OTHER PUBLICATIONS

"Non-Final Office Action Issued in U.S. Appl. No. 16/138,096", dated Mar. 23, 2020, 31 Pages.
(Continued)

*Primary Examiner* — Brian Whipple
*Assistant Examiner* — Gregory P Tolchinsky
(74) *Attorney, Agent, or Firm* — NovoTechIP International PLLC (57) ABSTRACT

A method and system for providing a seamless transition between applications is disclosed. The system includes a framework which includes an application manager for managing operations of the system, a component retriever in communications with the application manager for retrieving components associated with the applications, a data retriever in communications with the application manager for retrieving data associated with the applications, a memory for storing the retrieved components or data, and a service group including one or more services associated with applications.

17 Claims, 6 Drawing Sheets

(51) Int. Cl.
  *G06F 16/958* (2019.01)
  *G06F 9/445* (2018.01)
  *G06F 9/50* (2006.01)
  *H04L 29/08* (2006.01)
  *H04L 29/06* (2006.01)

(52) U.S. Cl.
  CPC .......... *G06F 16/986* (2019.01); *H04L 67/141* (2013.01); *H04L 67/42* (2013.01)

(56) References Cited

U.S. PATENT DOCUMENTS

| | | | |
|---|---|---|---|
| 7,552,195 | B2 | 6/2009 | Datta |
| 8,892,744 | B1 | 11/2014 | Scheffler et al. |
| 9,032,011 | B2 | 5/2015 | Walsky et al. |
| 9,229,980 | B2 | 1/2016 | Feng et al. |
| 9,280,338 | B1 | 3/2016 | Stickle et al. |
| 9,336,060 | B2 | 5/2016 | Nori et al. |
| 9,948,522 | B2 | 4/2018 | Marinelli et al. |
| 2008/0294854 | A1 | 11/2008 | Schneider et al. |
| 2009/0064133 | A1* | 3/2009 | Suchy .................. G06F 8/60 717/177 |
| 2013/0166692 | A1 | 6/2013 | Tjin et al. |
| 2015/0312176 | A1 | 10/2015 | Jones et al. |
| 2015/0317128 | A1 | 11/2015 | Baughman |
| 2015/0319144 | A1 | 11/2015 | Barton et al. |
| 2016/0092592 | A1 | 3/2016 | Bates et al. |
| 2016/0100030 | A1 | 4/2016 | Brown et al. |
| 2017/0034306 | A1 | 2/2017 | Thangeswaran |
| 2017/0102694 | A1 | 4/2017 | Enver et al. |
| 2017/0186418 | A1* | 6/2017 | Mairano .................. G10L 13/07 |
| 2017/0230457 | A1 | 8/2017 | Kumar et al. |
| 2017/0269791 | A1 | 9/2017 | Meyerzon et al. |
| 2017/0279922 | A1 | 9/2017 | Sharma et al. |
| 2017/0322678 | A1 | 11/2017 | Silvis et al. |
| 2017/0324829 | A1 | 11/2017 | Voronkov et al. |
| 2018/0063089 | A1 | 3/2018 | Moysi et al. |
| 2018/0113722 | A1 | 4/2018 | Waldbaum et al. |
| 2018/0124131 | A1 | 5/2018 | Bliss et al. |
| 2018/0219854 | A1 | 8/2018 | Miran et al. |
| 2018/0246859 | A1 | 8/2018 | Ray et al. |
| 2020/0099772 | A1 | 3/2020 | Ray et al. |

FOREIGN PATENT DOCUMENTS

| | | |
|---|---|---|
| CN | 108491206 A | 9/2018 |
| EP | 3049960 A1 | 8/2016 |
| WO | 2018132303 A1 | 7/2018 |

OTHER PUBLICATIONS

Korres, et al., "A Low-cost IoT-based Health Monitoring Platform Enriched with Social Networking Facilities", In Proceedings of IEEE International Conference on Pervasive Computing and Communications Workshops, Mar. 19, 2018, pp. 173-178.

Ma, et al., "MASA: A Cross-Platform Component Architecture for Building Mobile Applications with Service Caching", In Proceedings of IEEE 13th International Conference on e-Business Engineering, Nov. 4, 2016, pp. 264-269.

Simioni, et al., "In Pursuit of Architectural Agility: Experimenting with Microservices", In Proceedings of IEEE International Conference on Services Computing, Jul. 2, 2018, pp. 113-120.

Richardson, et al., "MICROSERVICES—From Design to Deployment", Published by NGINIX, Inc., May 18, 2016, 80 Pages.

"International Search Report and Written Opinion Issued in PCT Application No. PCT/US2019/039095", dated Oct. 2, 2019, 15 Pages.

"International Search Report and Written Opinion Issued in PCT Application No. PCT/US19/039105", dated Sep. 13, 2019, 12 Pages.

"Are SPAs (Single Page Applications) Suitable for Sites Aimed for Mobiles?", Retrieved from https://stackoverflow.com/questions/20229862/are-spas-single-page-applications-suitable-for-sites-aimed-for-mobiles, Retrieved on Aug. 7, 2018, 18 Pages.

"Prevent Reloading of Angular Component While Refreshing Page", Retrieved from https://stackoverflow.com/questions/48201709/prevent-reloading-of-angular-component-while-refreshing-page, Retrieved on Aug. 7, 2018, 4 Pages.

"SharePoint Home Web Application", Retrieved from https://microsoft.sharepoint.com/_layouts/15/sharepoint.aspx, Retrieved on Apr. 10, 2018, 1 Page.

"We Don't Need a Page Refresh: Single Page Apps", Retrieved from https://stellarbluetechnologies.com/2017/06/we-dont-need-a-page-refresh-single-page-apps/, Jun. 21, 2017, 7 Pages.

Dykstra, et al., "WebSockets Support in ASP.NET Core", Retrieved from https://docs.microsoft.com/en-us/aspnet/core/fundamentals/websockets?view=aspnetcore-2.1, Jun. 28, 2018, 8 Pages.

Arun, V.N.S, "How to Push Data from Server to Client Using SignalR", Retrieved from https://www.codeguru.com/columns/experts/how-to-push-data-from-server-to-client-using-signalr.htm, Jan. 16, 2014, 16 Pages.

Barkol, David, "Azure Event Grid Viewer with ASP.NET Core and SignalR", Retrieved from https://madeofstrings.com/2018/03/14/azure-event-grid-viewer-with-asp-net-core-and-signalr/, Mar. 14, 2018, 19 Pages.

Bienko, Christopher, "IBM Cloudant: The Do-More NoSQL Data Layer", Retrieved from http://www.redbooks.ibm.com/technotes/tips1187.pdf, Jun. 6, 2014, 12 Pages..

Caputo, et al., "Minimal Download Strategy overview", Retrieved from https://docs.microsoft.com/en-us/sharepoint/dev/general-development/minimal-download-strategy-overview, Sep. 25, 2017, 7 Pages.

Caputo, et al., "Overview of the SharePoint Framework", Retrieved from https://docs.microsoft.com/en-us/sharepoint/dev/spfx/sharepoint-framework-overview, Jan. 8, 2018, 4 Pages.

Fowler, David, "Azure SignalR Service, A Fully-Managed Service to Add Real-Time Functionality", Retrieved from https://azure.microsoft.com/en-us/blog/azure-signalr-service-a-fully-managed-service-to-add-real-time-functionality/, May 7, 2018, 6 Pages.

Moschel, Brian, "How to Add Real-Time Data to Your .NET Application", Retrieved from https://www.bitovi.com/blog/how-to-add-real-time-data-to-your-.net-application, Apr. 20, 2017, 19 Pages.

Vijayakumar, Karthikeyan, "SignalR—Why SignalR?", Retrieved from http://www.karthikscorner.com/sharepoint/why-signalr/, Apr. 22, 2016, 45 Pages.

"Final Office Action Issued in U.S. Appl. No. 16/138,096", dated Sep. 14, 2020, 34 Pages.

* cited by examiner

CONNECTED APPLICATION EXPERIENCE

CROSS-REFERENCE TO A RELATED APPLICATION

This patent application is related to co-pending, commonly-owned U.S. patent application Ser. No. 16/138,096 entitled "Cloud-Based Composable Data Layer," filed concurrently herewith, which is incorporated herein by reference in its entirety.

TECHNICAL FIELD

This disclosure relates generally to optimizing applications and, more particularly, to optimizing applications by connecting them through a common application framework that enables seamless transitions across application boundaries.

BACKGROUND

In recent years, there has been an increase in use of single page applications (SPAs), as these web applications provide a more pleasant user experience. Current SPAs manage all pertinent resources and data used for the SPA in isolation. This means that each SPA manages its' application resources and state in isolation from other SPAs. As a result, they serve a fluid user experience within the application scope. However, transitioning from one SPA to another requires a full-page load. Thus, the end-user perceived latency (EUPL) when transitioning between SPAs is affected by time constraints such as, the amount of time required to connect with the server, authenticate, schedule a web server thread, execute code behind the page, download pertinent resources, bootstrap essential services and/or fetch required data, before any pixels can be rendered on the page. This not only increases the time required to load a new SPA, but also results in inefficient use of resources.

One way to optimize EUPL is to define an application with a coarse-grained functional granularity where many disjointed scenarios are placed within the same SPA. While this approach does allow for some cost reduction in terms of server round-trip times and resource utilization, it does impose its own limitations. These limitations include a biased optimization catering to specific scenarios due to the coarse-grained granularity of the application, increased maintenance cost of an all-encompassing monolithic application, over-fitting constraints across disjointed scenarios, memory footprint, and the like. These factors limit a developer's ability to scale and maintain an application effectively and efficiently.

SUMMARY

In one general aspect, the instant application describes a system for transitioning from a first application to a second application. The system may comprise one or more processors and one or more machine-readable media storing instructions which, when executed by the one or more processors, cause the one or more processors to establish a framework. In one implementation, the framework comprises an application manager for managing one or more operations of the system, a component retriever in communications with the application manager for retrieving one or more components, each of the one or more components associated with the first application or the second application, a data retriever in communications with the application manager for retrieving data associated with the first application or the second application, a memory for storing at least one of the retrieved one or more components or the retrieved data, and a service group including one or more services, each of the one or more services associated with the first application or the second application. The one or more services in the service group may include one or more shared services that can be shared between the first application and the second application.

In another general aspect, the instant application describes a method for transitioning from a first application to a second application. The method may comprise establishing a framework for transitioning from the first application to the second application. In one implementation, the framework comprises an application manager for managing one or more operations of the system, a component retriever in communications with the application manager for retrieving one or more components, each of the one or more components associated with the first application or the second application, a data retriever in communications with the application manager for retrieving data associated with the first application or the second application, a memory for storing at least one of the retrieved one or more components or the retrieved data, and a service group including one or more services, each of the one or more services associated with the first application or the second application. The one or more services in the service group may include one or more shared services that can be shared between the first application and the second application.

In yet another general aspect, the instant application describes a non-transitory computer readable medium on which are stored instructions that when executed cause a programmable device to instantiate an application page. The application page may comprise a base page application and a base application, where the base page application defines a set of lifecycle stages the application page undergoes when processing a link on the application page.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

This description relates to techniques used for connecting individual applications into a virtual composite application that provides a seamless user experience as a user transitions between different applications. To do so, the solution utilizes a framework that enforces a well-defined set of lifecycle stages for each application, thereby ensuring consistency between different applications and allowing the framework to manage and optimize the different lifecycle stages, some of which are agnostic of the underlying application. The framework also provides for interleaving of application lifecycles to ensure controlled transitions between applications and more efficient management of resources, in addition to enabling reuse of common resources, such as data and services across different applications. As a result, the solution ensures that switching between different applications is treated as an in-place navigation, similar to what happens within a SPA, without requiring a full-page load. This connects different applications and provides in-session transitions between application boundaries which is more optimal than a full-page load, thereby creating the appearance of a virtual application that is composed of multiple applications.

As will be understood by persons of skill in the art upon reading this disclosure, benefits and advantages provided by such implementations can include, but are not limited to, a solution to the technical problems of user perceived latency in loading application pages and inefficient use of resources for these application pages. Technical solutions and implementations provided here optimize utilization of resources, services and states across applications and enable a seamless transition experience across application boundaries. The solutions also reduce the amount of time required for server round-trips without inhibiting long term application growth and maintenance. The benefits provided by these solutions enable application developers to focus on core application specific scenarios, without worrying about common page-based application needs.

Figure 1:
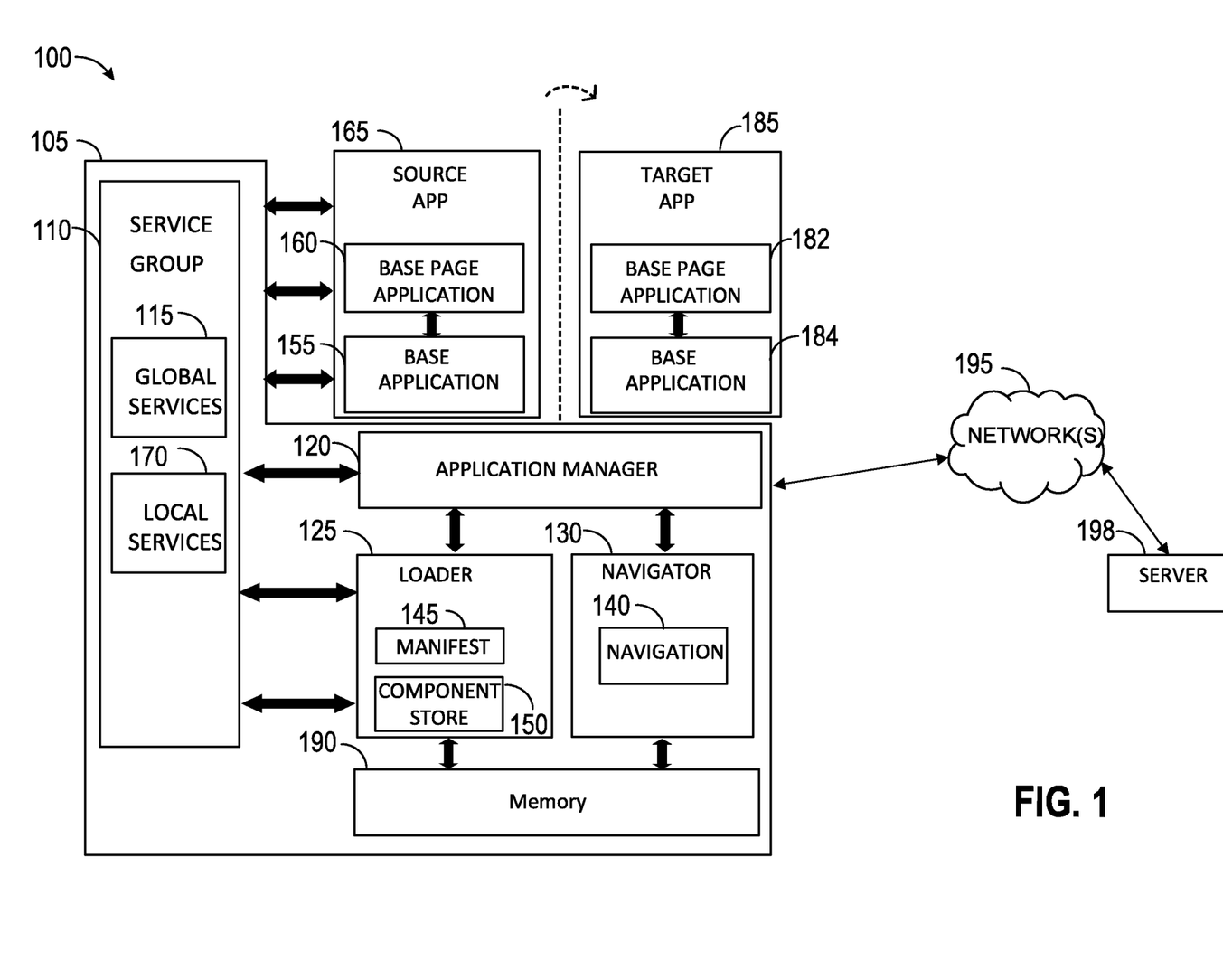
FIG. 1 illustrates a block diagram showing an overview of a system utilizing a connected application framework which can be used for connecting individual applications into one virtual composite application.

FIG. 1 illustrates a block diagram showing an overview of a system 100 utilizing a connected applications framework 105 which can be used for connecting individual applications into a virtual composite application. The connected applications framework 105 may include an application manager 120 for managing various functions for the application pages, a navigator 125 for navigating links and obtaining data for the application pages, a loader 130 for loading an application manifest and one or more necessary components, and a service group 110 which may function as a service locator for various services available and/or needed for each application page utilizing the framework 105.

The application manager 120 may be in communication with the navigator 130, and loader 125 for managing routing and navigation functionalities. For example, the application manager 120 may rely on the loader 125 to get the application manifest information, and may direct the navigator 130 to load application data. The application manager 120 may also invoke the application lifecycle stages to start an application. In one implementation, the application manager 120 may also be in communications with the service group 110 for locating services, when needed. Although not shown, the application manager 120 may also be connected to the memory 190 and in directed communications with both the source application (source app) 165 and target application (target app 185). The loader 125 is in communications with the memory 190 to store and access required information, and it is also connected to the service group 110 to provide the location of those services to the service group 110.

In addition to the elements discussed above, the system 100 may also include a navigation 140 as part of the navigator 130, and a manifest 145 and a component store 150 as part of the loader 125. The navigation 140 may function as a data store for storing data associated with the source application, target application, and/or data prefetched for highly probable click-through applications, as discussed further below. In one implementation, the navigation 140 may function as a memory cache that is backed up by the browser session storage. As such, the navigation 140 may be a part of the memory 190. Furthermore, the navigation 140 may not be aware of the source of data (i.e., whether the data is prefetched or not, or whether it belongs to the source application or target application). It may simply obtain the data, store it for a period of time, and serve it from the cache as long as it is applicable.

The manifest 145 may function as a configuration file containing metadata about the component (e.g., current application page). Such information may include the type of component (e.g., application, library), identifier for the component (e.g., name of the application), its version, dependencies, a composition of necessary components that need to be downloaded for the application to run, among other things. Although shown here only as one block, the loader may include multiple manifests, two of which include manifests for the source and target applications during transitions times. For example, when the framework is transitioning from the source App 165 to the target App 185, the loader may include a manifest for the source App 165 and one for the target App 185. This allows the system 100 to identify common components that appear in different component manifests, thus obviating the need to reload those components when switching application boundaries, and as such optimizing load times. Although, shown in FIG. 1 as part of the loader 145, the manifest may be stored in the memory 190.

The component store 150 may maintain a library of available components downloaded within a given session. Components, may include, for example, java script components required for running an application. All components required for initial loading of the application should be loaded before the application can run. In one implementation, the component store 150 also stores the components themselves. Alternatively, the components may be cached in memory 190. The loader 135, on the other hand, may manage the component downloads and their dependencies. By storing a list of components for each page, the component store 150 can help ensure common components are reused between the source and target application. This allows the system 100 to leverage the client host layer to optimize loading of common components when starting new applications within the same session, thus improving successive application load times as the system transitions between application boundaries.

Each service included in the service group 110 may be responsible for performing one or more functions for each application page. The services may be self-contained entities that adhere to well-defined rules. The service group 110 may act as a container to which various services are exposed. In this manner, the service group 110 can function as a service locator. In one implementation, the service group 110 is created when the framework instantiates.

Each service may be composed of a specific service component which may be an instance of a particular type of service that serves some function. In one implementation, while the framework 105 manages the services, each service is responsible for its own component. For example, when a service is loaded, the service may use a specific component configuration to initialize its component. For example, applications that extend a base page application may provide service configurations for global (shared) services which can be used to instantiate services. Each service may wrap a service component and expose it in the service group 110 such that the application can fetch the service component when required. In one implementation, services are independent of each other and hence composable. The framework 105 may provide some default component configurations, while allowing the consuming application to extend or override the default configurations, when needed.

In one implementation, the framework 105 is responsible for composing and managing the services for which the service group 110 has the location information. Managing the services may include, for example, loading the services as part of the loading process of an application page and disposing of them, when pertinent, as part of the unloading process. In one implementation, the base page application is responsible for creating the services in accordance with application provided service configurations and for exposing the services in the service group for easy access.

The services created by the base page application may include cores services, shared services, and local services. Core services may include a set of services and service components that are common to most connected applications and/or are required or used by all applications utilizing the system 100. These services are provided as part of the framework 105 but are specific to each application and as such may need to be loaded again when transitioning to a new application. These core services may include, for example, a routing service which may manage application route changes, and a store management service which may handle internal application states. The base page application may rely on the pertinent service configurations provided by the application to instantiate these services and expose them in the service group 110 as a local service. Managing core services at a framework level allows optimizations to be automatically available to all applications and enables the framework to improve the performance of all connected applications.

Shared Services may include services that are not required by every application. Once exposed, however these services may be reused across applications. Examples of shared services include a persisted data service, which may expose a web-socket to serve application data requests and can be reused across applications to ensure a persistent connection between applications, and an accessibility management service which may be used for ensuring applications are accessible. Because these services are shared between applications, their default implementation may be provided by the framework and exposed in the global service scope of the service group 110. By utilizing the shared service element 115, the framework ensures that the shared services are available across applications for immediate use.

Local services may include services that are unique to specific applications. Examples of local services include a data provider service which may enable obtaining application specific data and a navigation management service which may assist in internal application navigation and data requests.

In one implementation, there are two categories of services that are exposed to the service group 110. One is local services 170 which include the local services discussed above, and another is the global services 115 (i.e., shared services). The local services may only be exposed to the application, while the global services may be exposed across applications. The global services may provide a composable and configurable set of global services that can be shared between all applications and are thus not bound to any specific application. In one implementation, all shared services are part of the global services scope 115, thereby ensuring their availability through the application scope. This ensures a consistent interaction pattern with all applications. Sharing these services across applications also allows for better utilization of resources. The service group 110 may locate all the services for which it has the location information, using service keys stored in the component store 150.

Scoping application services into global and local services provides service level isolation. This is because global services are provided within a global scope and as such not disposed of when transitioning to a new application within a session. Application specific services hosted within a local scope are, on the other hand, available within the application lifecycle and disposed of when transitioning to a new application. Scoping of services at different levels provides efficient management of computing and memory resources. Moreover, reusing the global services allows the system to reduce the overall computing time and memory footprint when starting a new application, as the global services can be immediately put into use. This improves application start times and hence the overall EUPL.

The routing service of the core services may manage routing for the application page and may include a router component. In one implementation, the framework 105 loads the routing service as part of the application page load. The routing service may use the route configuration provided by the application page to initialize the router component. After initializing the router component, the framework 105 may then bind the router component to the application page document object model (DOM) as part of rendering the application.

The routing service may provide at least two key functionalities. These include managing internal application navigation and invoking the navigator 130 for handling in-place application navigation. The internal application navigation may follow application specific configurations to enable navigation within the application page, while the in-place application navigation may provide navigation between different connected applications.

In one implementation, the framework 105 provides in-place application navigation through the following functionalities: managed route injection, initiate in-place navigation, determination of system-hosted applications, application-interleaving, and invoking pertinent lifecycle stages.

Managed route injection may include the routing service injecting a managed route into every application's internal route configurations. While application routes may be managed by each application, external routes that are not supported by the application may automatically fallback to the router component.

Initiating in-place navigation may include the routing service interacting with the navigator 125 to initiate an in-place application navigation when applicable. This may occur, for example, when a user clicks on an application link.

Determining if an application is a connected application may involve the navigator 125 requesting the target application's manifest to determine whether the underlying route path corresponds to a connected (system-hosted) application (i.e., a compatible connected application), as discussed further below. If the pertinent manifest is available, the navigator 125 may initiate an in-place application transition. The in-place navigation may be managed by the application manager 120 through the process of interleaving the pertinent lifecycle stages of the source and target applications, as discussed further below.

Each application may provide the necessary service configurations that the framework 105 relies upon to provision the services for the application. These necessary service configurations may include a route configuration that is required to instantiate and start the routing service, a store configuration that is needed to instantiate and start the store management service, and a render configuration that is required to instantiate and start the page rendering service. Providing these service configurations gives application developers the flexibility to focus on application specific services without worrying about the core services, while enabling the system 100 to optimize the core services which benefit all applications.

In one implementation, all portions of the framework 105 are located in a host application layer on a client device, once a first connected application is downloaded and instantiated on the client device. To download the first application, the client device may need to request components and data from a server such as the server 198 of FIG. 1 through a network 195. Once the framework is download in the host application layer, however, subsequent loading of other connected applications may not require a full application load. Moreover, once the host layer (i.e., application kernel) is loaded, it may be reused across connected applications. Furthermore, by storing the component and manifest stores in the host layer, the framework can reuse components and data resources across applications. This is because components function as libraries. As such, when applications consume common libraries, the libraries can be reused. This enhances performance as the libraries do not need to be loaded multiple times. In this manner, leveraging the underlying host layer allows for better control of resource and state management and gives the developers an opportunity to improve the overall performance of page-based applications that share the framework.

In addition to the framework 105, the host application layer may also host the source application 165 which extends its base page application 160, which, in turn, extends the base application 155. In one implementation, a base application, such as the base application 155 includes some basic components required for the application to run. The base page application extends those components to a full list which may include shared services and core services required to provide a seamless transition between applications. In one implementation, however, the base application and base page application are combined to form a single unit which contains all of the components needed for the application to function properly. The base application may be located on a common layer which includes the framework 105 and may work with the navigator 125 which in turn works with the application manager 120 to provide seamless transitions between applications.

As shown in FIG. 1, during the transition period, the source App 165 and target App 185 can exist side by side. As such, the target application 185 has a base page application 182 which extends the target base application 184.

The base applications 155 and 184 require their respective consuming applications (i.e., source app 165 and target app 185) to provide the set of component configurations which are then used to bootstrap essential page components required by the application. The base applications 155 and 184 provide default implementations of these components, while allowing the consuming applications to override and/or extend those components, when pertinent.

The base applications 155 and 184 also manage page components within service boundaries. This ensures service isolation and enforces a clear separation of concerns. Services are exposed to the application through the system 100's service scope. The framework enforces a consistent interaction pattern when consuming services, thereby enabling services backed by common configurations to be reused across application boundaries. This allows the system 100 to optimize service instantiations when transitioning between applications and improves the overall latency to start applications while enforcing clear design patterns.

In one implementation, the framework 105 directs all connected applications to abide by a well-defined set of processing stages, which are referred to herein as an application's lifecycle. Enforcing a lifecycle ensures consistency between different applications and allows the application manager 120 to interleave lifecycle stages between two applications when crossing application boundaries. These lifecycle stages may include a before-page load stage, after-page load stage, before-page render stage, after-page render stage, and before-page unload stage.

The before-page load stage is the processing stage when the application has initiated the application loading stage, but before the framework actually begins loading the underlying application resources. At this stage, applications can undertake specific operations such as preloading components, waiting for application context to be available, and the like.

The after-page load stage is trigged after the application's resources and services are loaded, but before the application initiates rendering. During this stage, the framework 105 informs the application that all core services are available, and it can undertake specific operations like logging telemetry, staging experiments, and the like.

The before-page render stage is triggered when the application has instructed to begin rendering of the application, but before the rendering process has begun. At this stage, applications can undertake specific operations including staging browser specific behaviors.

The after-page render stage is triggered after the application has triggered a render operation to render the underlying application. At this stage, applications can undertake specific operations like logging engagement and the like.

The before-page unload stage is triggered before the application is unload and its resources disposed. At this stage, applications can undertake operations such as removing application listeners and the like.

It should be noted that although, these lifecycle stages are set by the framework 105 and imposed on all connected applications, in one implementation, application developers can override some specific stages of an application's lifecycle as they deem appropriate.

Figure 2:
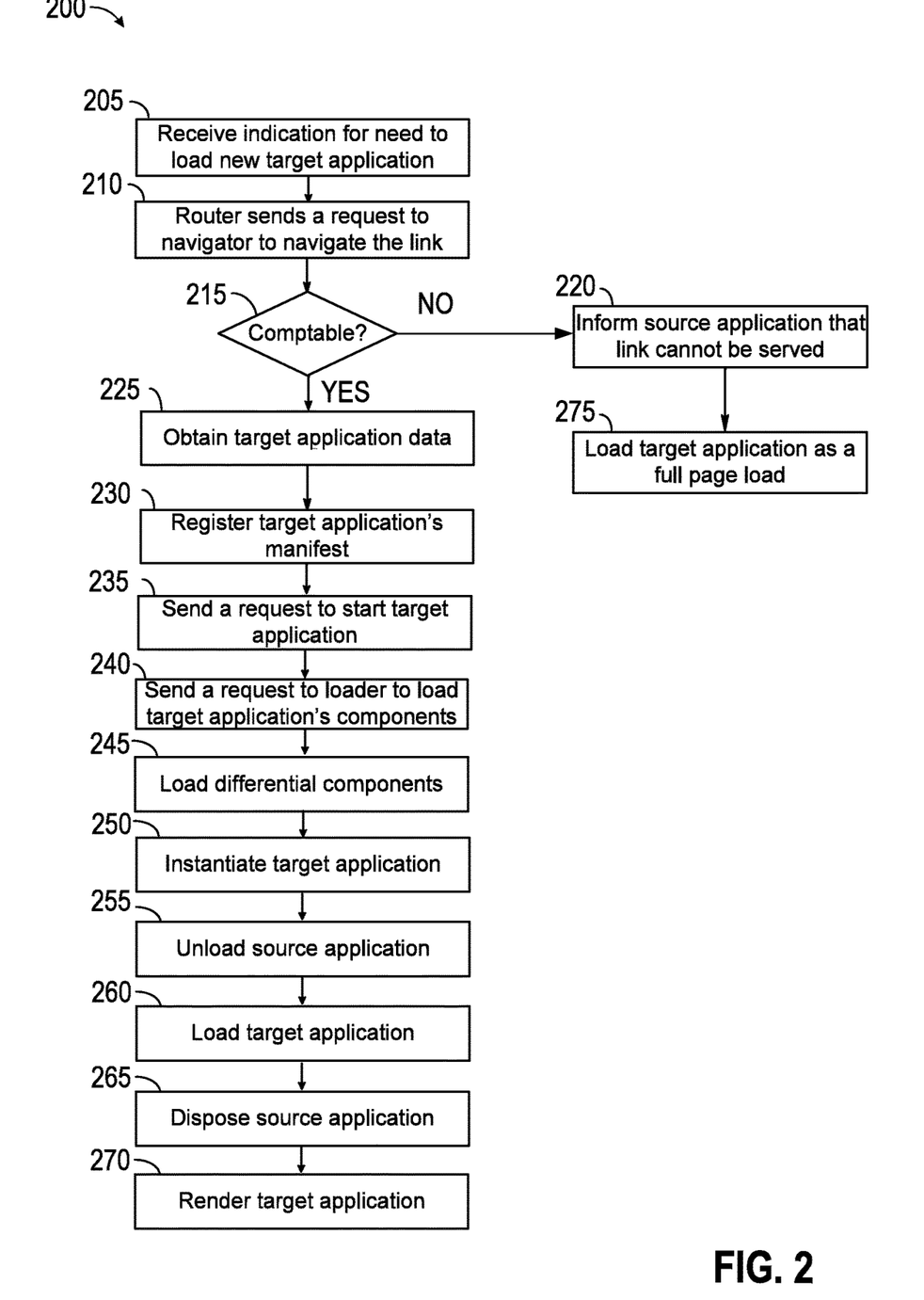
FIG. 2 is a flow diagram for transitioning from a source application to a target application in a system utilizing a connected application framework.

FIG. 2 is a flow diagram depicting an exemplary method 200 for transitioning from a source application to a target application in a system utilizing a connected application framework. At 205, the method 200 begins by receiving an indication that a new application should be loaded. This may occur after a user clicks on a link on the source application displayed on a display device of the client device, when the link is one that is not handled by the application itself. In one implementation, after receiving an indication of a click on a link for an application from the user, the router of the current (source) application sends a request to the navigator of the framework, at 210, to navigate the link. The navigator may determine if the target application (i.e., the application associated with the link) is compatible with the framework, at 215, by, for example, verifying if the navigator has a manifest associated with the link.

If it is determined, at 215, that the target application is not compatible with the connected applications framework, the navigator then informs the source application, at 220, that the link cannot be served by the framework. The source application will then load the application as a full-page load, at 275. This may happen for applications that are not supported by the framework and/or for applications that are on a different origin. If, however, it is determined, at 215, that the target application is compatible with the connected applications framework and on the same origin, then the navigator obtains the target application's data which may include its manifest, at 225. The navigator may retrieve the data resources from the server through one or more networks.

At this stage, the navigator registers the target application's manifest with the loader, at 230, before sending a request to the application manager to start the target application, at 235 Upon receiving the request, the application manager, in turn, sends an instruction to the loader, at 240, to retrieve the target application's components.

The loader may then retrieve the differential component resources by first loading the manifest, which contains the component dependencies, and then retrieving the components and their associated dependencies that are not available in the manifest. In one implementation, the retrieved components and data are cached in one or more local storage devices. Components related to core services may already be cached in a storage device associated with the framework and may thus not need be retrieved. Components that are not available in the component store (i.e., local services) may be obtained from the server. Reusing components across applications allows for optimizing component downloads and thus results in faster application load times.

In one implementation, some of the required resources may have already been prefetched by the loader and navigator. This may occur in instances, where a currently running application identifies highly probably click-through target applications to which the source application has a link and instructs the navigator to prefetch those resources. In such a case, the navigator may fetch the underlying data for the potential target application and persist the data in the manifest. In this case, however, the navigator does not send a request to the application manager to start the target application, upon retrieving the associated data. A prefetch function may also occur where an application prefetches one or more components that have a high likelihood of being loaded in the future. This may be done by sending a request to the loader to preload those components. The loader may then first obtain the manifest associated with the components from the manifest store, and then load the components and their dependencies mentioned in the component manifest to the component store. Then, when a link is clicked, and in-place-navigation is initiated, the prefetched data and component resources are served from local cache. By prefetching resources for highly probable click-through target applications, the framework significantly reduces the time required to transition to a new page, thus decreasing EUPL and providing a more seamless transition between application pages.

Once the required components and data are retrieved, the application manager may instantiate the target application, at 250. This may be done, by creating a new chrome (i.e., one or more DOM placeholders) and initiating in-place navigation.

Figure 3:
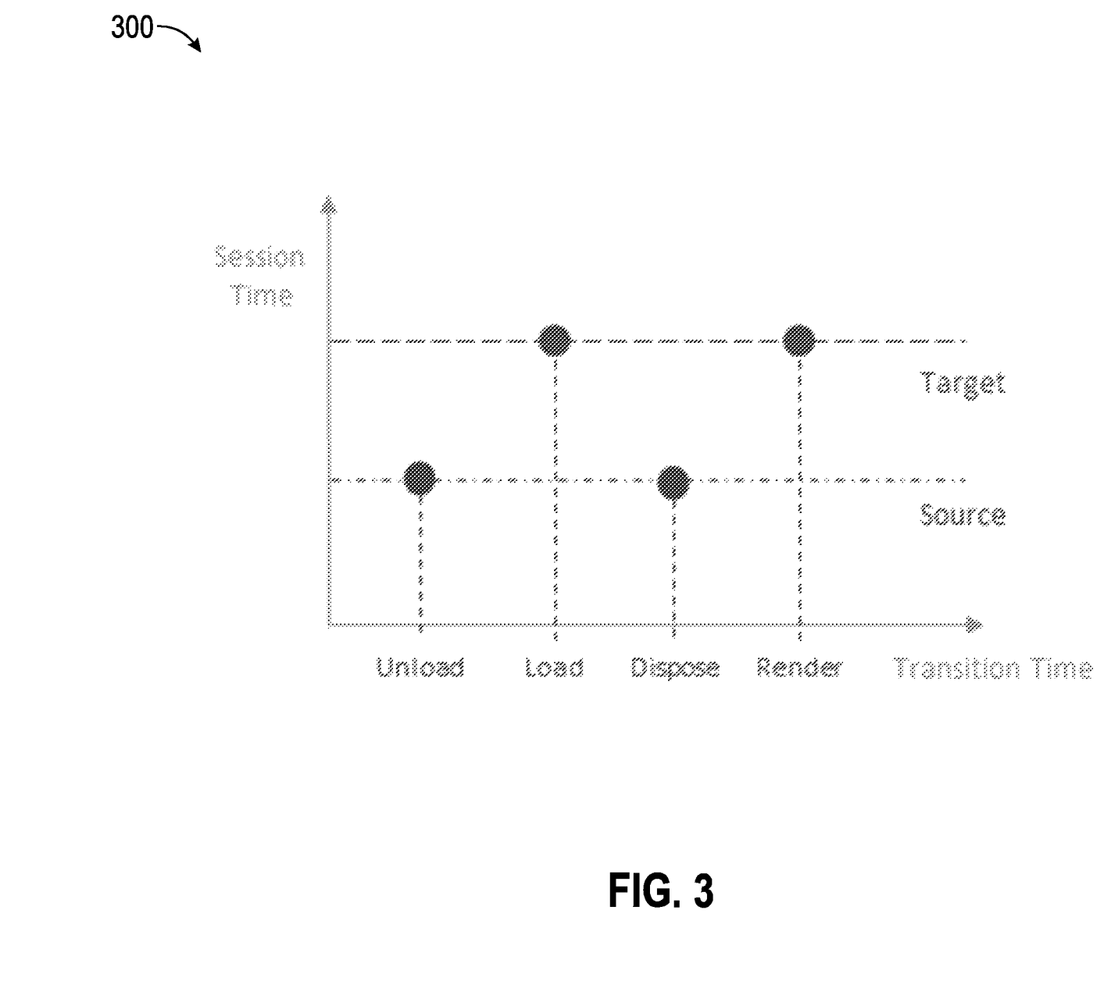
FIG. 3 is a chart depicting various processing stages of a source and target application, as the system transitions from the source application to the target application.

At this state, the application manager, has a handle to both the source application and the target application. This is illustrated in FIG. 1, where both the source App 165 and the target App 185 are presented side by side. By allowing the application manager to have a handle for both applications, the framework enables the application manager to interleave specific lifecycle stages of the source and target application to allow for an in-place application transition. This is depicted in FIG. 3, where the y axis displays the session time and the x axis shows the transition time. As can be seen, during the transition time period, the source application is unloaded, but not yet disposed of until after the target application is loaded. During this stage, the source application may still be visible on the display device. This allows for the source application to provide a transitioning experience to the user. Once the source application is disposed of, then the source applications' instance on the display is hidden and deleted before the target application is rendered.

Referring back to FIG. 2, once the application manager instantiates the target application and begins the process of interleaving, it starts unloading the source application, at 255. In one implementation, as part of the unloading process of the source application, the on before page load and on unload lifecycles are invoked on the source application. The application manager, then initiates loading the target application, at 260. In one implementation, as part of the loading process of the target application, the on before load, on unload, and on after load lifecycles are invoked on the target application.

After the target application is loaded, the application manager initiates disposing of the source application, at 265. During this stage all services and data specific to the source application are removed and the source application display instant is hidden and deleted. In one implementation, as part of the disposing process of the source application, the on before page dispose, and on dispose load lifecycles are invoked on the source application. Once the source application is removed, the target application's themes are applied, and the target application is rendered, at 270, at which point the transition to the new application is complete. In one implementation, as part of the rendering process of the target application, the on before render, on render, and on after render lifecycles are invoked on the target application.

Because the framework is able to reuse the shared services and shared data, easily access the core services, and prefetch resources for highly probable target applications, the process of transitioning to a new page is faster and more efficient by utilizing fewer resources.

Figure 4:
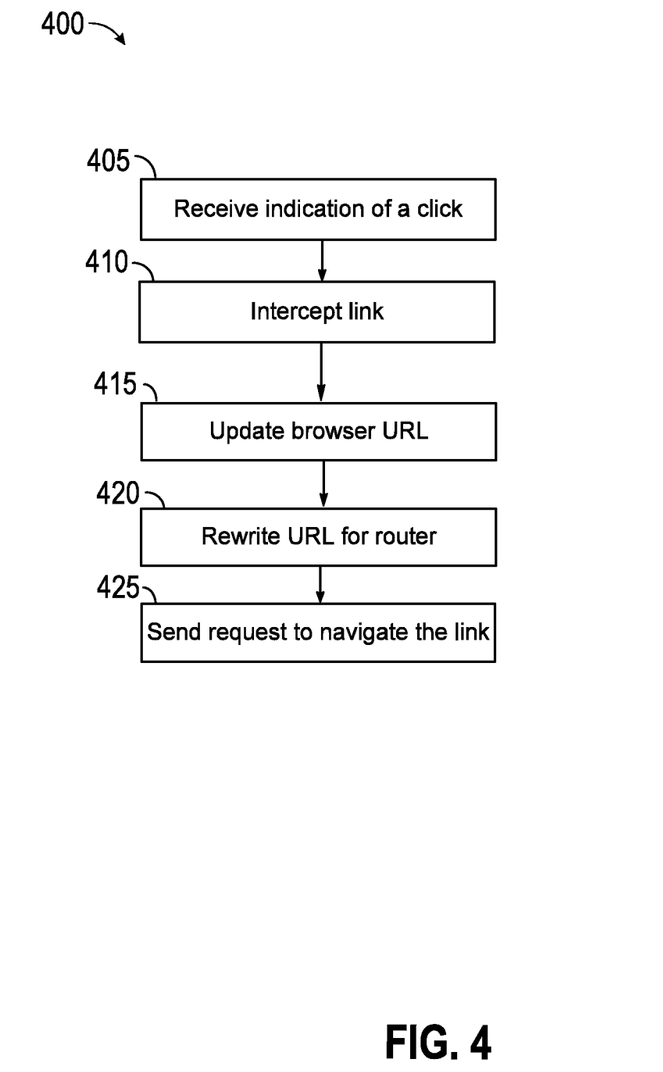
FIG. 4 is a flow diagram depicting an exemplary method for operations of a routing service provided by the framework for seamless transitioning between connected applications.

FIG. 4 is a flow diagram depicting an exemplary method 400 for operations of the core routing service provided by the framework for seamless transitioning between connected applications. At 405, the method 400 begins by receiving an indication of a click on a link within the source application. The click triggers the core routing service to start operating by first intercepting the link, at 410. This interception is done to override the browser's default link clicking behavior (i.e., navigating to another page) and instead pushing the new application page uniform resource locator (URL) onto a browser history state, thus causing the URL to be updated without a forced navigation, at 415.

After the browser URL has been updated, the routing service rewrites the route associated with the link, at 420. This is because applications commonly map several complex routes to the same logical path within the application. The rewriting functionality allows the routing service to modify any links clicked on to a single path for the application to execute. In one implementation, the framework first determines if the routes in the applications are simple enough to follow when the pages are loaded, and if so the rewriting step may not be performed.

Once rewriting the link has been performed, the routing service sends a request to the navigator, at 425, to determine if the application to which the link points, is a connected application page, and if so to initiate the process of transitioning from the source application the target application. This may include performing the steps discussed above with respect to FIG. 2.

Figure 5:
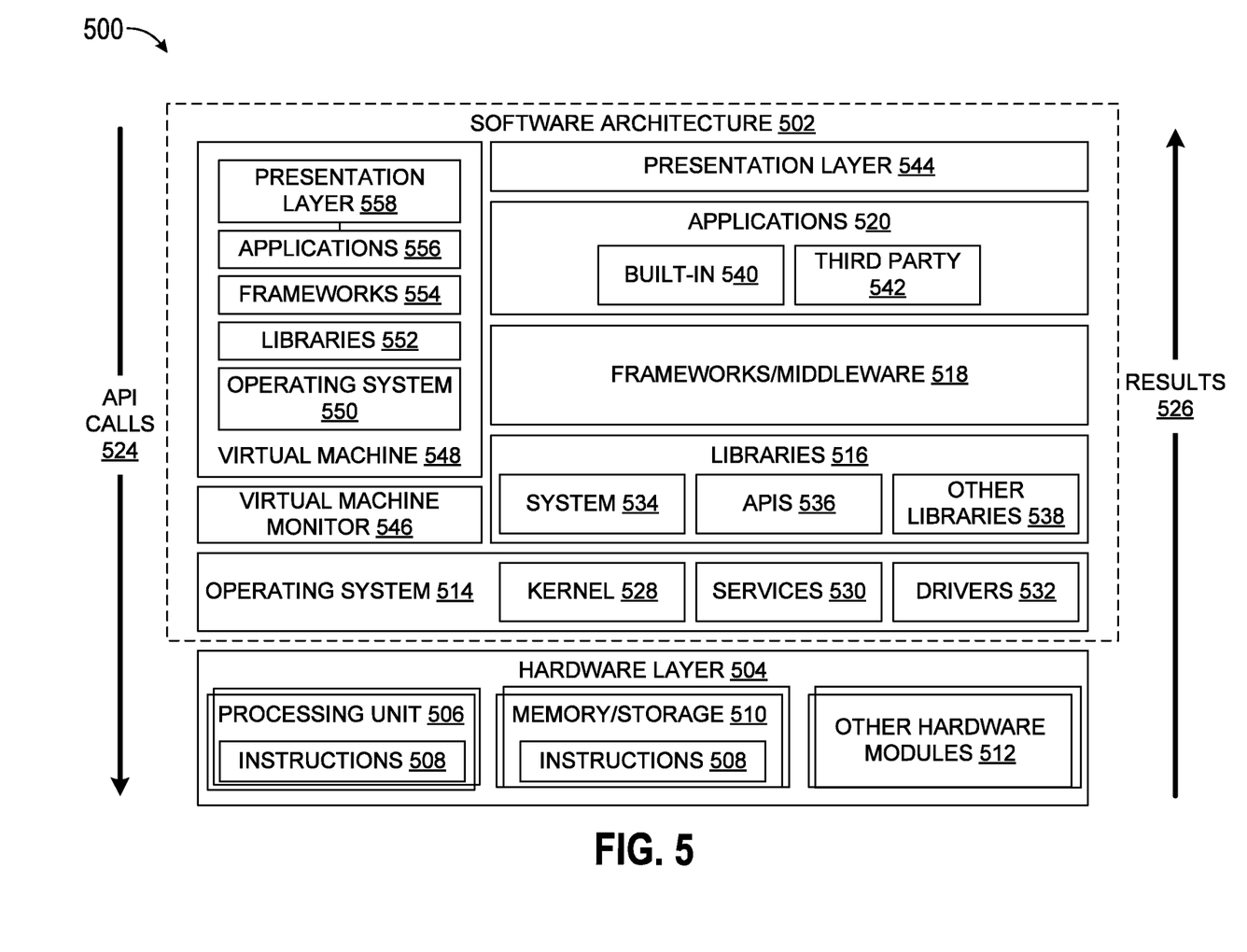
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
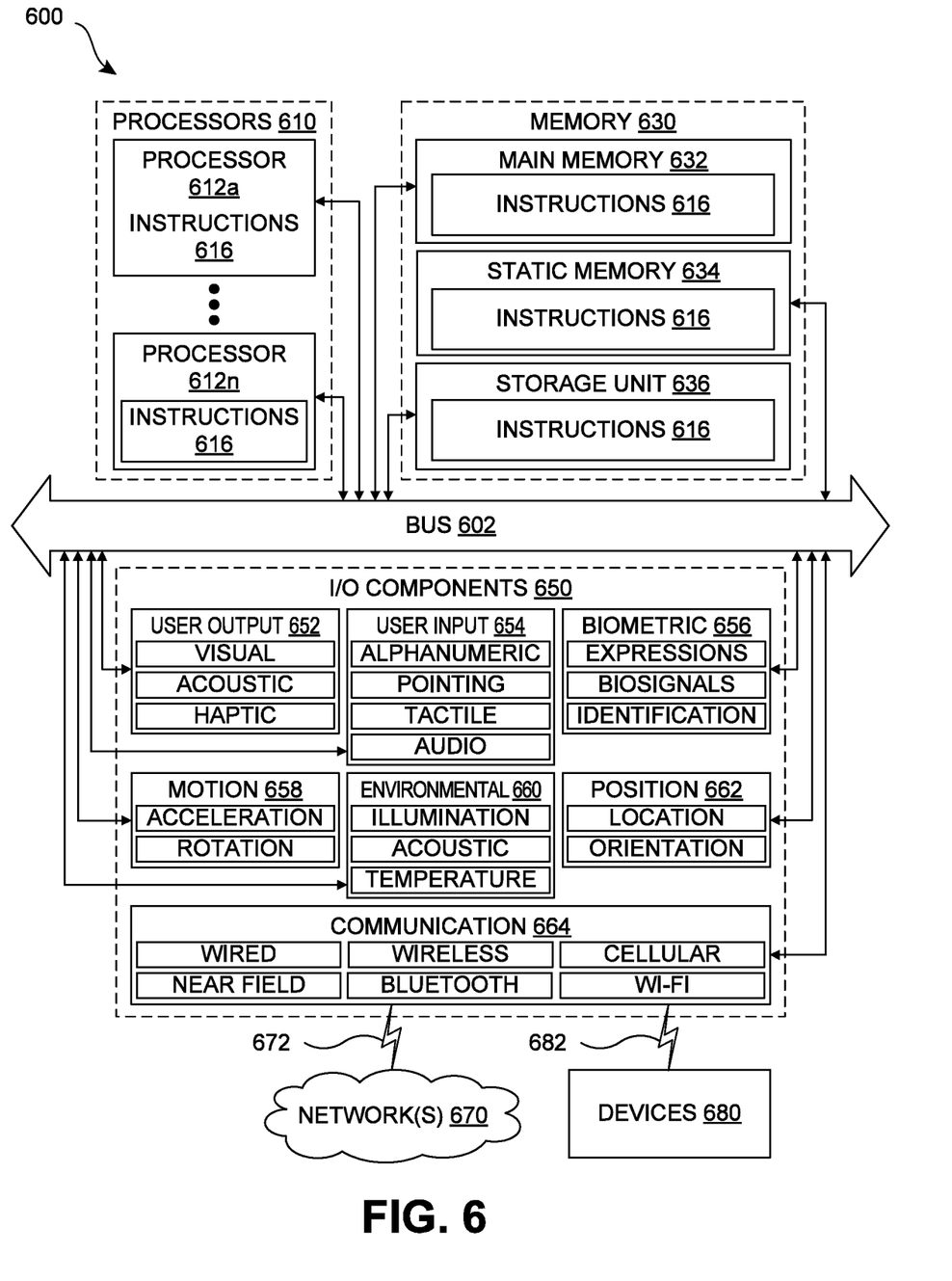
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" include a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

It is noted that although the examples in FIGS. 1-4 are discussed with respect to single-page applications executing within web browser applications, the described techniques may also be applied for providing access to computer-implemented services to multi-page web applications executed within web browser applications, native applications, other network-capable applications, and server systems.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for transitioning from a first application to a second application, the system comprising:
   one or more processors; and
   one or more machine-readable media storing instructions which, when executed by the one or more processors, cause the one or more processors to establish a framework, the framework comprising:
      an application manager for managing one or more operations of the system;
      a component retriever in communications with the application manager for retrieving one or more components, each of the one or more components associated with the first application or the second application;
      a data retriever in communications with the application manager for retrieving data associated with the first application or the second application;
      a memory for storing at least one of the retrieved one or more components or the retrieved data; and
      a service group including one or more services, each of the one or more services associated with the first application or the second application;
   wherein:
      the one or more services in the service group include at least one of shared services that can be shared between the first application and the second application;
      the instructions, when executed by the one or more processors, further cause the one or more processors to transition from the first application to the second application by:
         receiving an indication that the second application should be loaded;
         determining if the second application is compatible with the system;
         upon determining that the second application is compatible with the system, identifying one or more resources associated with the second application that are not used for the first application;
         obtaining the identified one or more resources associated with the second application;
         instantiating the second application;
         unloading one or more resources associated with the first application that are not used for the second application;
         loading the one or more resources associated with the second application;
         disposing of the first application; and
         rendering the second application.

2. The system of claim 1, wherein the one or more resources associated with the second application include at least one of the one or more components and data.

3. The system of claim 2, wherein the instructions further cause the one or more processors to handle the first application and the second application within a same user session.

4. The system of claim 1, wherein the shared services are reused for the second application once the system transitions from the first application to the second application.

5. The system of claim 4, wherein the instructions further cause the one or more processors to transition from the first application to the second application by caching the one or more resources associated with the second application in the memory.

6. The system of claim 4, wherein one or more resources associated with the second application which are also used for the first application are reused from the memory when transitioning from the first application to the second application.

7. The system of claim 1, wherein the component retriever includes at least one of a manifest file containing a list of one or more resources required by the first application and a component store containing a library of components available in a session.

8. The system of claim 1, wherein the data retriever includes a navigation store.

9. A method for transitioning from a first application to a second application comprising:
   establishing a framework for transitioning from the first application to the second application, the framework comprising:
      an application manager for managing one or more operations of system for transitioning from the first application to the second application;
      a component retriever in communications with the application manager for retrieving one or more components, each of the one or more components associated with the first application or the second application;
      a data retriever in communications with the application manager for retrieving data associated with the first application or the second application;
      a memory for storing at least one of the retrieved one or more components or the retrieved data; and
      a service group including one or more services, each of the one or more services associated with the first application or the second application;
   receiving an indication that the second application should be loaded;
   determining if the second application is compatible with the system;
   upon determining that the second application is compatible with the system, identifying one or more resources associated with the second application that are not used for the first application;
   obtaining the one or more resources associated with the second application;
   instantiating the second application;
   unloading one or more resources of the first application that are not used for the second application;

loading the one or more resources associated with the second application;

disposing of the first application; and rending the second application, wherein the one or more services in the service group include at least one of shared services that can be shared between the first application and the second application.

10. The method of claim 9, further comprising prefetching one or more resources associated with the second application.

11. The method of claim 10, wherein the one or more prefetched resources include resources associated with the second application that are not used by the first application.

12. The method of claim 9, further comprising:

intercepting a uniform resource link (URL) associated with the second application;

updating the URL;

rewriting a route associated with the URL; and triggering a fallback route for the second application.

13. The method of claim 12, wherein upon triggering the fallback route, the application manager sends a request to retrieve a manifest associated with the second application.

14. A non-transitory computer readable medium on which are stored instructions that when executed cause a programmable device to:

establish a framework for transitioning from a first application to a second application, the framework comprising:

an application manager for managing one or more operations of a system for transitioning from the first application to the second application;

a component retriever in communications with the application manager for retrieving one or more components, each of the one or more components associated with the first application or the second application;

a data retriever in communications with the application manager for retrieving data associated with the first application or the second application;

a memory for storing at least one of the retrieved one or more components or the retrieved data; and a service group including one or more services, each of the one or more services associated with the first application or the second application;

receive an indication that the second application should be loaded;

determine if the second application is compatible with a system for transitioning from the first application to the second application;

upon determining that the second application is compatible with the system, identify one or more resources associated with the second application that are not used for the first application;

obtain the one or more resources associated with the second application;

instantiate the second application;

unload one or more resources of the first application that are not used for the second application;

load the one or more resources associated with the second application;

dispose of the first application; and render the second application, wherein the one or more services in the service group include at least one of shared services that can be shared between the first application and the second application.

15. The non-transitory computer readable medium of claim 14, wherein the one or more resources associated with the second application include at least one of the one or more components and data.

16. The non-transitory computer readable medium of claim 14, wherein the shared services are reused for the second application once the system transitions from the first application to the second application.

17. The non-transitory computer readable medium of claim 14, wherein the component retriever includes at least one of a manifest file containing a list of one or more resources required by the first application and a component store containing a library of components available in a session.

* * * * *